Jan. 3, 1967        H. E. PETERS        3,296,552
ATOMIC MASER WITH IMPROVED ATOMIC FLUX INTENSITY CONTROL
Filed April 6, 1964
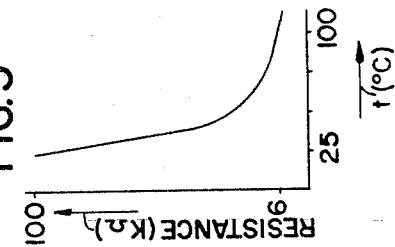
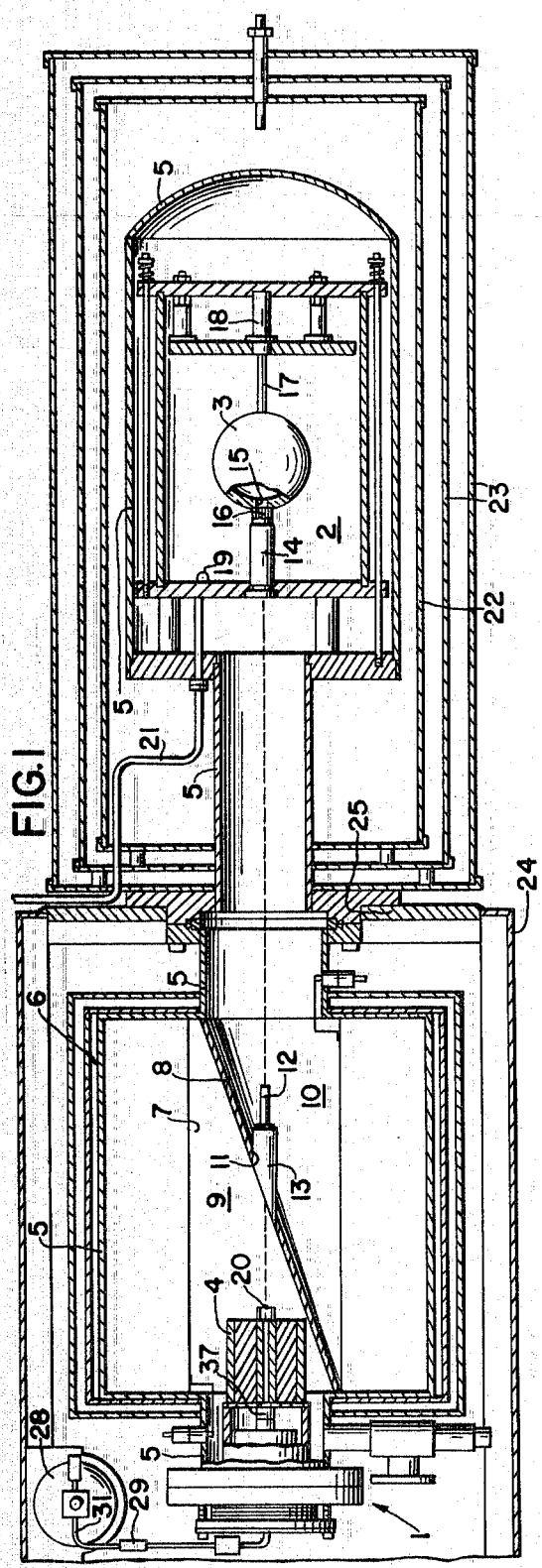
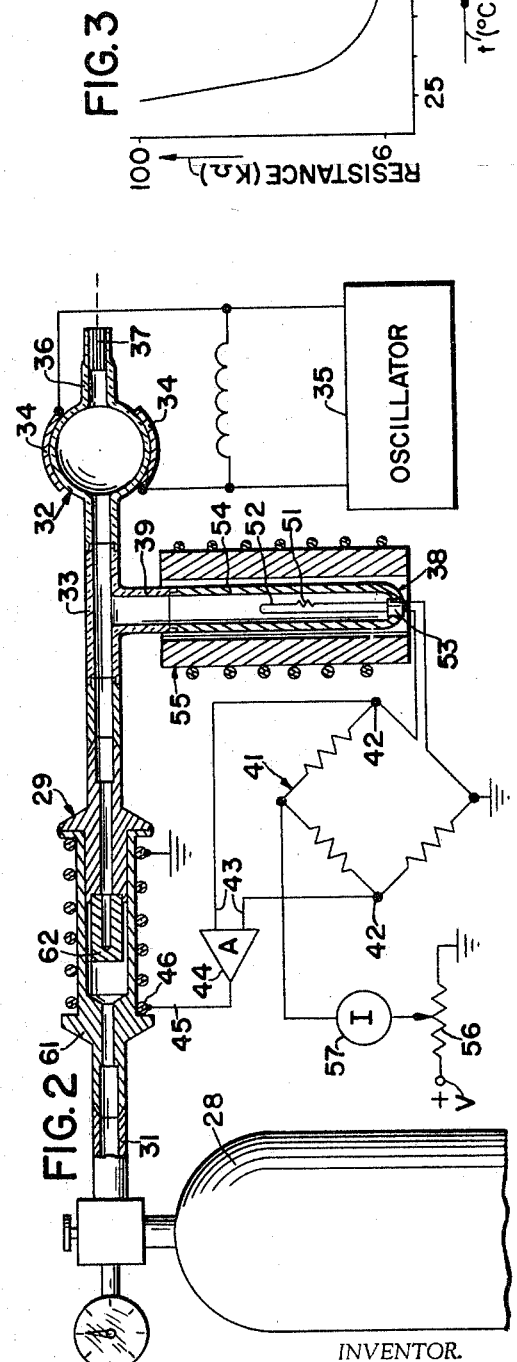
*INVENTOR.*
HARRY E. PETERS
BY *Harry E. Aine*
ATTORNEY

United States Patent Office 3,296,552
Patented Jan. 3, 1967

3,296,552
ATOMIC MASER WITH IMPROVED ATOMIC FLUX
INTENSITY CONTROL
Harry E. Peters, Beverly, Mass., assignor to Varian Associates, Palo Alto, Calif., a corporation of California
Filed Apr. 6, 1964, Ser. No. 357,731
4 Claims. (Cl. 331—94)

The present invention relates in general to atomic masers and more particularly to an improved atomic flux intensity control for atomic maser devices whereby such devices are rendered more stable in frequency and efficient as regards use of atomic material. Such atomic masers are extremely useful as frequency standards and stabilizers and are also useful for measuring magnetic fields.

Heretofore hydrogen maser frequency standards have been built wherein a beam of atomic hydrogen in a hyperfine energy state is projected into a storage bulb within a cavity resonator resonant at the hyperfine resonance frequency. The hyperfine energy atoms are stored for a time on the order of one second within the cavity by means of a bounce box. During the storage time the atoms are caused to udergo a hyperfine transition to a lower energy state giving up emission at the hyperfine frequency. The spontaneous emission of radiation from the hydrogen atoms is coherent and has extremely high spectral purity. Wave energy is extracted from the cavity and may be utilized for a frequency standard, for a frequency control and the like. Such a hydrogen maser is described in U.S. patent application 142,356 entitled, "Atomic Hydrogen Maser," inventor, Norman F. Ramsey, et al., filed October 2, 1961, now issued as U.S. Patent 3,255,423 on June 7, 1966, and assigned to the same assignee as the present invention.

One of the problems encountered in the prior art hydrogen maser was that the beam of atomic hydrogen, as projected into the maser cavity, was not easily controlled in intensity and fluctuated in intensity over a wide range. Moreover, it was difficult to determine and to calibrate the beam intensity. The prior beam intensity control mechanism constituted a calibrated leak for controlling the amount of hydrogen gas to be disassociated for producing the atomic hydrogen. With the calibrated leak, as the hydrogen gas was fed to the leak was used up out of its storage container, the flow of gas to the disassociater decreased and so also did the beam intensity.

In the present invention, a palladium leak is servo- controlled from a precise pressure measuring device to control the flow of gas to the hydrogen disassociater for precisely controlling the beam intensity to any desired level. In a preferred embodiment, hydrogen is stored in a storage bottle at relatively high pressure such as, for example, from 1,000 to 2,500 p.s.i. Hydrogen is fed from the storage bottle to the palladium leak. The temperature of the leak is controlled to control the flow of hydrogen gas. A Pirani type pressure sensing device senses the gas pressure applied to the disassociater and by means of a differential amplifier controls the temperature of the palladium leak to control the flow of hydrogen gas to the disassociater.

The principal object of the present invention is to provide an improved atomic hydrogen maser having improved frequency stability and beam intensity control.

One feature of the present invention is a beam intensity control utilizing a palladium leak for controlling the beam intensity in response to the pressure within the hydrogen disassociater whereby the beam intensity is controlled to a high degree of accuracy.

Another feature of the present invention is the same as the preceding feature wherein the pressure is sensed by a sensing device of the Pirani type whereby the pressure may be monitored to a high degree of accuracy.

Another feature of the present invention is the same as the preceding feature wherein the Pirani pressure sensing element is surrounded by an enclosure operating at a controlled temperature.

Another feature of the present invention is the same as the preceding feature wherein the Pirani gauge sensing device has its output connected to a differential amplifier and the output of the differential amplifier has its output connected to the palladium leak for controlling the temperature thereof whereby an extremely simple and stable control of the beam intensity is obtained.

Other features and advantages of the present invention become apparent upon perusal of the specification taken in connection with the accompanying drawings wherein:

FIG. 1 is a longitudinal sectional view of the hydrogen maser apparatus employing features of the present invention, FIG. 2 is an enlarged schematic diagram of an atomic hydrogen beam source apparatus useful in the apparatus of FIG. 1, and FIG. 3 is a graph of resistance versus temperature for the thermistor sensing element of the pressure measuring device of FIG. 2.

Referring now to FIG. 1, there is shown in partial cross-sectional view the hydrogen maser apparatus of the present invention. The apparatus includes a beam generating device 1 for forming and projecting a beam of atomic hydrogen generally longitudinally of the tube apparatus. A cavity resonator 2 is disposed at the terminal end of the beam path. The cavity resonator 2 contains therewithin a storage bulb 3 or bounce box of pyrex or glass with a non-relaxing wall coating as of Teflon for storing the atomic hydrogen particles for on the order of one second duration before they exit from the bulb 3 through the entrance port. Within the bulb 3 the stored particles undergo a hyperfine transition at about 1420 megacycles giving off coherent spontaneous emission of radiation which is extremely stable in frequency.

A state selecting hexapole magnet 4 is disposed at the up stream end of the atomic beam path for focusing out of the beam the hydrogen atoms that are not in the desired upper hyperfine energy state. An elongated vacuum envelope structure 5 surrounds the cavity and the beam path inbetween the source 1 and the cavity 2. A vacuum pump 6 surrounds the initial portion of the beam path and forms a combined envelope portion and vacuum pump 6. This combined envelope and pump feature forms the subject matter of U.S. application Serial 357,722 filed April 6, 1964, now issued as U.S. Patent 3,278,857 on October 11, 1966, and assigned to the same assignee as the present invention. The vacuum pump 6 is of the getter ion type described in U.S. Patent 2,983,433 issued May 9, 1961.

The pump 6 contains a hollow rectangular central chamber 7. A septum 8 is disposed diagonally across the chamber 7 dividing the pump into an up stream portion 9 and a down stream portion 10. The septum 8 is centrally apertured and carries therefrom an elongated small diameter bore tube 12 as of ¼" diameter with its bore in axial alignment with the beam path. The tube 12 is sealed over an aperture 11 in the septum 8 via the intermediary of a support tube 13 of slightly larger diameter than the narrow bore tube 12. The small diameter bore tube 12 is for the purpose of allowing the beam to pass through the septum 8 while permitting the pressure in the down stream portion 10 of the chamber 7 to be operated at a pressure substantially below the pressure of the up stream portion 9 of the envelope 5 since the small bore offers very high impedance to gas flow therethrough. In addition, the small bore tube 12 serves as an additional beam collimator for eliminating certain beam particles emerging from the state selecting magnet 4. The particles eliminated are not in the proper state and have been slightly deflected out of the desired beam path. A stopping bead 20 is carried in axial alignment with the center of the beam slightly downstream of the hexapole state selecting magnet 4 for stopping all beam particles on the center line of the beam which therefore had not "seen" the strong focusing magnetic fields of the hexapole magnet 4. In a typical example, about 1% of the total atomic particle beam flux emerging from the source 1 passes through collimator tube 12. Therefore, 99% of the initial beam flux is pumped from the upstream chamber 9 of the pump 6.

The storage bulb 3 is supported within the cavity resonator 2 via the intermediary of a dielectric tube 14 with its axial bore in coaxial alignment with the hydrogen beam path for passage of the beam therethrough. The bulb 3 is provided with an aperture 15 in axial alignment with the tube 14. Multiple hole collimator 16 is disposed in a narrow neck portion of tube 14. Atomic hydrogen beam particles pass through the tube 14, collimator 16, aperture 15 and into the bulb 3.

Within the bulb, the beam particles undergo many successive wall collisions as of more than 10,000 before they finally pass out of the bulb via aperture 15, collimator 16 and tube 14. The collimator 16 comprises a bundle of 25 axially aligned glass tubes 2" long and 1/8" inside diameter, the bundle of tubes being approximately 1/2" in diameter. A dielectric support rod 17 is fixedly secured to the bulb 3 and extends away from the bulb 3 in a way that is diametrically opposed to the support tube 14. The dielectric rod 17 is supported in a spring loaded pocket 18 and together with the tube 14 supports the dielectric storage bulb 3 within the cavity 2. A coupling loop 19 is formed in the end of a coaxial line 21 and passes into the cavity 2, is coupled to the field thereof, and serves to extract the output signal of the maser and passes same to a suitable utilization device, not shown.

A hollow cylindrical oven 22 surrounds the maser cavity 2 and retains same at a precisely controlled temperature as of, for example, 40° C. This prevents uncontrolled shifts in the frequency of the maser cavity due to temperature variations of the ambient environment. A pair of spaced hollow cylindrical magnetic shields 23 which are closed at their ends coaxially surround the cavity 2 to prevent stray magnetic fields from passing through the storage bulb tube 3. If these stray fields were not shielded they could stimulate undesired transitions and would have a second order effect upon the frequency of the maser oscillations.

A suitable cabinet 24 surrounds the lower portion of the tube and supports the tube via the intermediary of a heavy flange 25 as of aluminum fixedly secured to a reduced neck portion of the vacuum envelope 5.

Referring now to FIG. 2 there is shown the novel beam intensity control apparatus of the present invention. Molecular hydrogen gas for use in the maser is stored in a storage bottle 28 at a relatively high pressure as of, for example, 2,000 p.s.i. A palladium leak 29 is connected to the high pressure bottle 28 via the intermediary of high pressure metallic tubulation 31. The palladium leak 29, which will be more fully described below, serves to variably control the flow of molecular hydrogen gas from the bottle 28 to a hydrogen disassociater 32 via the intermediary of a suitable tubulation 33 as of, for example, 7052 glass manufactured by Corning. An R.F. discharge is established in the disassociater 32 as of 7740 Pyrex for disassociating the molecular hydrogen into atomic hydrogen. The R.F. discharge is established by means of a pair of capacitive plates 34 disposed straddling the bulb portion 32 of the disassociater. The plates 34 form the capacitance of a resonant circuit, the resonant circuit being the tank of an oscillator 35. The oscillating fields of the tank circuit pass through the walls of the bulb 32 and sustain the R.F. discharge. An elongated exit tube 36 as of glass is connected to the disassociater bulb 32. A collimator 37 comprised of a bundle of elongated small diameter bore glass tubes fits within the end of the exit tube 36 and serves to collimate the atomic hydrogen atoms leaving the disassociater 32 into the desired beam path.

A pressure sensing device 38 using the Pirani principle is connected to the disassociater 32 by being disposed in the base leg of a "T" section of the tubing 33. The pressure sensing element 38 forms one arm of Wheatstone bridge 41. If the pressure in arm 39 and therefore the pressure in the disassociator 32 differs from the pressure for which the bridge 41 is balanced, an electrical signal appears across terminals 42 of the bridge. The electrical unbalance signal is fed to the input of high gain stable D.C. differential amplifier 44 via leads 43. The output of the differential amplifier 44 is fed via lead 45 to a heater coil 46 of the palladium leak 29. The heater coil 46 controls the temperature of the palladium leak 29 which in turn controls the flow of hydrogen gas fed through to the disassociator 32.

The pressure sensing device 38 comprises a hairpin shaped conductive structure 52 made up of a pair of support legs as of 0.030" diameter Kovar connected in series with a thermistor bead 51 having a pair of wire leads as of 0.001" diameter platinum iridium alloy. The hairpin shaped conductor has two leads passing out of the pressure sensing device 38 via an insulated glass bead 53. The thermistor bead 51 is to operate at substantially a fixed temperature, in this case approximately 100° C. For this temperature the thermistor bead 51 has a resistance of approximately 6,000 ohms and the bridge is balanced for this value of resistance.

The T section base leg 39 includes a lower tubular metallic extension 54 as of Kovar which surrounds the thermistor bead 51 and is held at a constant temperature as of, for example, 40° C. by means of an oven 55. The oven 55 is thermostatically controlled to hold the constant temperature by means of a thermostat, not shown, and is formed by a hollow copper block. The wall temperature of the tube 54 which surrounds the bead 51 is held below the temperature of the thermistor 51 such that the thermistor is cooled by conduction of heat from the thermistor 51 to the surrounding tube 54 via the intermediary of the gas. The thermal conducting properties of the hydrogen gas are a direct function of its pressure. Thus, fluctuations in the gas pressure within the disassociator and tubing 33, 39 and 54 produce fluctuations in the temperature and resistance of the thermistor bead 51.

The operating current is supplied to the bridge 41 by means of a potentiometer 56. The potentiometer 56 is connected across a suitable source of potential such as, for example, a battery of 8 to 20 volts. A certain fraction of the current supplied to the bridge 41 from the potentiometer 56 appears as heating current for the thermistor bead 51. At some value of gas pressure in the space between the thermistor element 51 and the surrounding wall 54 there will be just sufficient conduction of heat from the thermistor bead 51 to maintain the temperature of the thermistor at 100° C. at which time the bridge will be balanced. However, if the pressure within the disassociater 32 should decrease the conduction of heat from the thermistor bead 51 to the surrounding tube 54 will be decreased and the bead will tend to increase in temperature, thereby decreasing its resistance and unbalancing the bridge 41.

The unbalance of the bridge 41 at terminals 42 is amplified in amplifier 44 and fed to the heater 46 for increasing the temperature of the palladium leak 29 and allowing more gas to flow from the bottle 28 into the disassociator 32. This increases the pressure in the space adjacent to the thermistor bead 51 causing the cooling thereof to be increased and returning the temperature of the thermistor bead 51 to the initial 100° C. temperature. Thus, for any given amount of current supplied to the bridge 41 from the potentiometer 56, the thermistor element 51, by means of the bridge and palladium leak, serves to control or regulate the gas pressure within the disassociator 32 to a given value. The initial pressure can be set to any desired level by varying the potentiometer 56 to supply more or less current to the bridge 41 thereby producing more or less heating of thermistor bead 51.

A current measuring meter 57 is disposed in circuit between the potentiometer 56 and the bridge 41 for monitoring the current to the bridge 41. The current meter 57 may be calibrated in terms of pressure corresponding to the certain current supplied to the bridge 41. In this manner an absolute measure of the pressure supplied to the disassociator is obtained.

Since the beam flux intensity is directly related to the gas pressure in the disassociator 32, the pressure control system controls the beam intensity. It is desirable that the beam intensity be regulated, as higher than necessary beam intensity will use up the hydrogen gas at a faster rate and the operating life of the maser will be shortened unless the source of gas is replenished. On the other hand if the intensity of the beam is too low maser oscillations will not be sustained within the cavity 2 and there will be no output signal.

Moreover, it is important that the beam intensity be regulated to less than one percent variation since if the maser cavity 2 is slightly detuned from its proper operating frequency these fluctuations in beam intensity will show up as frequency deviations in the output frequency of the maser. In addition, it is desirable to have means for controlling the beam intensity since by varying the beam intensity in a given way and observing the output frequency of the maser the maser cavity 2 may be tuned to the exact resonant frequency of the hyperfine transition. The beam intensity control apparatus previously described controls random variations in beam intensity to plus or minus one percent.

The gas pressure in the disassociator 32 is preferably operated within the range of 0.02 millimeter of mercury to 0.04 millimeter of mercury. The beam flux intensity is on the order of $10^{16}$ particles per second as it emerges from the collimator 37. This beam intensity corresponds to a flow of hydrogen through the palladium leak 29 of approximately $10^{-6}$ liters per second at atmospheric pressure.

The palladium leak 29 includes the hollow stainless steel bobbin 61 having the insulated heater wire 46 wound thereon. A hollow palladium plug 62 is made of a palladium silver alloy of 70 percent palladium and 30 percent silver. The palladium plug is brazed across an internal shoulder of the stainless bobbin. The interior diameter of the palladium plug is approximately 0.04 inch in diameter and its outside surface is spaced from the inside of the bobbin by approximately 0.0015 inch. The bobbin has a length of approximately one inch and has an external diameter of approximately 0.375 inch and an internal diameter of approximately 0.250 inch. In use, the palladium leak 29 is operated over a temperature range of 80–150° C. In addition to serving as a controllable leak for hydrogen gas it also serves to purify hydrogen gas passing therethrough.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A hydrogen flux control apparatus for a hydrogen maser apparatus including, means for disassociating molecular hydrogen to form atomic hydrogen to produce an assemblage of hydrogen atoms in a higher energy state, a source of molecular hydrogen gas connected to said disassociater means for feeding molecular hydrogen to said disassociater, means forming a temperature responsive gas leak connected between said source of molecular hydrogen and said disassociator means for controlling the flow of molecular hydrogen from said source to said disassociater means, a pressure sensing means in gas communication with the down stream side of said leak for sensing the gas pressure on the down stream side of said leak, and means responsive to said pressure sensing means for controlling the temperature of said temperature responsive leak for controlling the atomic hydrogen flux intensity of said maser apparatus.

2. The apparatus according to claim 1 wherein said temperature responsive leak is a palladium leak and said pressure sensing means includes a thermistor element.

3. The apparatus according to claim 2 wherein said leak temperature controlling means includes an electrical bridge and said thermistor element is mounted in said bridge in one arm thereof for unbalancing the bridge, and the output signal of said bridge is utilized for controlling the temperature of said palladium leak.

4. The apparatus according to claim 3 including a wall surrounding said thermistor element, said wall being disposed in an oven operating at a controlled temperature below the operating temperature of said thermistor element, the gas pressure on the down stream side of said palladium leak serving to control the conduction of heat from said thermistor element to said wall and serving to rebalance said bridge by returning the temperature of said thermistor element to a fixed pre-determined temperature whereby said thermistor operates at a fixed temperature over the entire operating range of the atomic hydrogen flux control apparatus.

No references cited.

NATHAN KAUFMAN, *Primary Examiner.*

S. H. GRIMM, *Assistant Examiner.*